US012011414B2

(12) United States Patent
Rock

(10) Patent No.: US 12,011,414 B2
(45) Date of Patent: Jun. 18, 2024

(54) ROLLING CANE

(71) Applicant: Rhonda Rock, Granite Bay, CA (US)

(72) Inventor: Rhonda Rock, Granite Bay, CA (US)

( * ) Notice: Subject to any disclaimer, the term of this patent is extended or adjusted under 35 U.S.C. 154(b) by 275 days.

(21) Appl. No.: 17/641,180

(22) PCT Filed: Nov. 8, 2020

(86) PCT No.: PCT/US2020/059593

§ 371 (c)(1),
(2) Date: Mar. 8, 2022

(87) PCT Pub. No.: WO2021/092530

PCT Pub. Date: May 14, 2021

(65) Prior Publication Data

US 2022/0339054 A1 Oct. 27, 2022

Related U.S. Application Data

(60) Provisional application No. 62/974,034, filed on Nov. 8, 2019.

(51) Int. Cl.
*A61H 3/04* (2006.01)
*A45B 1/02* (2006.01)
*A61H 3/00* (2006.01)

(52) U.S. Cl.
CPC ................ *A61H 3/04* (2013.01); *A45B 1/02* (2013.01); *A61H 2003/002* (2013.01); *A61H 2201/0192* (2013.01); *A61H 2201/1253* (2013.01); *A61H 2201/1635* (2013.01)

(58) Field of Classification Search
CPC ........................... A61H 2003/002; A45B 1/02
See application file for complete search history.

(56) References Cited

U.S. PATENT DOCUMENTS 2,210,493 A 8/1940 Frank
2,835,503 A * 5/1958 Humphries ............ A01G 20/30 D34/24
3,774,929 A * 11/1973 Stanley ..................... B62B 3/14 D34/21
4,044,784 A 8/1977 Smith
4,800,911 A * 1/1989 Endres ..................... A61H 3/00 D12/130
4,987,912 A 1/1991 Taylor
5,046,748 A * 9/1991 Oat-Judge ............ B62B 5/0438 482/68

(Continued)

FOREIGN PATENT DOCUMENTS

CN 103800180 1/2018
EP 3075369 10/2016
FR 2612476 9/1988

OTHER PUBLICATIONS

PCT/US2020/59593, International Search Report and Written Opinion dated Feb. 9, 2022. 4 pages.

*Primary Examiner* — Noah Chandler Hawk
(74) *Attorney, Agent, or Firm* — Heisler & Associates

(57) ABSTRACT

A one handed walk assist device featuring a handle and plurality of legs affixed to a variably shaped support frame, featuring various independent embodiments including an embodiment trapezoidal orientation between the front and back legs, and an embodiment apparatus orientation that is angled backwardly. A variety of storage/carriage compartments are disclosed.

15 Claims, 16 Drawing Sheets

(56) References Cited

U.S. PATENT DOCUMENTS

| | | | | | |
|---|---|---|---|---|---|
| 5,311,880 | A * | 5/1994 | Lancaster | A61H 3/04 600/595 |
| 5,647,602 | A | 7/1997 | Nevin | |
| 5,692,533 | A | 12/1997 | Meltzer | |
| 5,887,887 | A * | 3/1999 | Keuning | A61H 3/04 280/47.38 |
| 6,158,453 | A | 12/2000 | Nasco | |
| 6,877,519 | B2 | 4/2005 | Fink | |
| 7,673,641 | B2 | 3/2010 | Karasin et al. | |
| 2003/0010368 | A1 | 1/2003 | Mackinnon | |
| 2003/0094191 | A1 | 5/2003 | Lin | |
| 2003/0205265 | A1 | 11/2003 | Willis | |
| 2005/0274405 | A1 | 12/2005 | Tartaglia | |
| 2008/0078431 | A1 | 4/2008 | Battiston | |
| 2014/0261594 | A1 | 9/2014 | Salomon | |
| 2017/0129523 | A1* | 5/2017 | Hane | B62B 5/0414 |
| 2019/0126966 | A1* | 5/2019 | Griffith | B62B 5/0033 |

* cited by examiner

ROLLING CANE

CROSS-REFERENCE TO RELATED APPLICATIONS

The application is claims priority to and is a national phase entry of PCT Application No. PCT/US2020/59593, titled “Rolling Cane,” filed Nov. 8, 2020, which claims priority to U.S. Provisional Patent Application Ser. No. 62/974,034, filed on Nov. 8, 2019, entitled “ROLLING CANE,” the contents of which are incorporated by reference herein in their entirety and made part of this specification.

FIELD OF THE INVENTION

The field of the present invention relates to an apparatus to assist with ambulation generally, and more specifically an assistive walking device related to the field of walkers and canes.

BACKGROUND

Many people need an assistive walking device to help with balance, instability or pain. An assistive device may aid a person, allowing the individual to walk more safely and independently. The vast majority of assistive walking devices are single point canes and two handed walkers. A single point cane apparatus provides minimal support to the user. Two handed walkers provide substantial support but can be unwieldy and burdensome for those not requiring that level of assistive support.

Thus, an assistive walking device may provide balance and stability with walking and standing, which may, in turn, allow the user safer mobility, independence, and a better quality of life. Additionally a walking device can help to reduce pain by transferring some of the weight off the painful limb or body and onto the support or assistive device. People with neurological sequelae following a stroke, or suffering from Parkinson’s disease, multiple sclerosis, arthritis, foot or leg pain, balance problems, weakness, or a multitude of other conditions can benefit significantly from the added balance and support of an appropriate walking device. Furthermore, people with recent surgery on one side of their body, or paralysis, may require a one handed device in their strong hand to provide adequate support for them to be safer with mobility.

The vast majority of assistive walking devices are single point canes and two handed walkers, which demands the least coordination of all the assistive devices. A single point cane provides minimal support to the user and the two handed walker provides substantial support but can be unwieldy and burdensome for those not requiring that level of assistive support. There is, therefore, a lack of devices for people requiring an intermediate level of support-users who find the cane to be inadequate due to too little support and the two handed walker unnecessary. The use of a two handed walker when it is not needed can lead to decreased large muscle strength, poor posture, and a loss in balance and maneuverability.

There is, therefore, a lack of devices for people requiring an intermediate level of support-users who find the cane to be inadequate due to too little support and the walker unnecessary.

The prior art includes walkers and canes designed to assist with ambulation. For example, U.S. Pat. No. 6,158,453 to Nasco, discloses, in part, a wheel mounted cane secured to extend laterally from a four-wheeled carriage for use in supporting and balancing a user. U.S. Pat. No. 564,760 to Nevin, discloses, in part, a hemi-wheeled walker which is, in particular, useful to hemiplegics. U.S. Pat. No. 6,877,519 to Fink, discloses, in part, a collapsible side wheeled walker to accommodate a user walking to one side of the walker while holding the walker. U.S. Patent Application Pub. No. US2003/0094191A1 to Lin, discloses, in part, a walk assist device that includes a handle and base connected to a lower end of the handle, with two brake members extending from two ends of the base, and two frames pivotably connected to the base. U.S. Pat. No. to Karasin et al., discloses, in part, a rolling, braking cane. The prior art devices have a suboptimal orientation of wheels and glider supports, and lack an efficiently accessible storage compartment. What is needed is an optimally-proportioned, rolling cane, with an efficiently accessible storage compartment, that may be operated with one hand.

SUMMARY

Aspects of the present invention describe a one-handed walking device which is necessary and desired by some users. The present inventive assistive walking, device may help patients with a stronger upper limb, allowing them to offload weight from a painful, weaker side, or post surgical side—resulting in improved balance, decreased pain, and a lessened fall risk. Certain embodiments of the present invention disclose a rolling cane with four points of contact, which increases the base of support, in turn providing increased support and balance for the user. The present inventive assistive walking device provides more support and balance to the user than a single point cane. In certain embodiments it may have four continuous points of contact on the ground, with a handgrip relatively centrally placed to allow force down through the center of the device’s base of support for stability and control. In certain cases, the apparatus may be used in the opposite hand of an affected leg and works in tandem with it to increase balance and aid in weight distribution. Aspects and embodiments of the present invention include an easy rolling motion, more like a two handed walker, but only requiring one hand. Further, the present inventive apparatus is compact and agile, and allows more fluid and continuous motion during ambulation.

Further, because the inventive apparatus does not need to be picked up with each step, it improves energy efficiency, energy conservation, and results in improved stability for the user. Additionally, torque and other joint stresses can be minimized by using the present inventive assistive walking device.

Moreover, pain or injury can make a person avoid weight bearing on an affected side in an attempt to unload the mechanical stress on the painful area. Therefore the time is decreased in single limb stance phase of a normal gait pattern on the affected side. The present inventive assistive walking device provides support during single limb stance phase which increases stability and allows for a more normal gait pattern and decreased pain. Studies have shown that the ground reaction force from the floor through a cane counteracts contralateral pelvic tilt during the swing phase of gait and the result is decreased joint compression forces at the hip. This may be improved through use of the presently disclosed apparatus.

Therefore, an optimally-proportioned, rolling assistive walking cane, with efficient storage, having the benefit of a plurality of legs terminating in wheels and plurality of back leg terminating in gliders, with compartment storage is disclosed.

DETAILED DESCRIPTION

Figure 1:
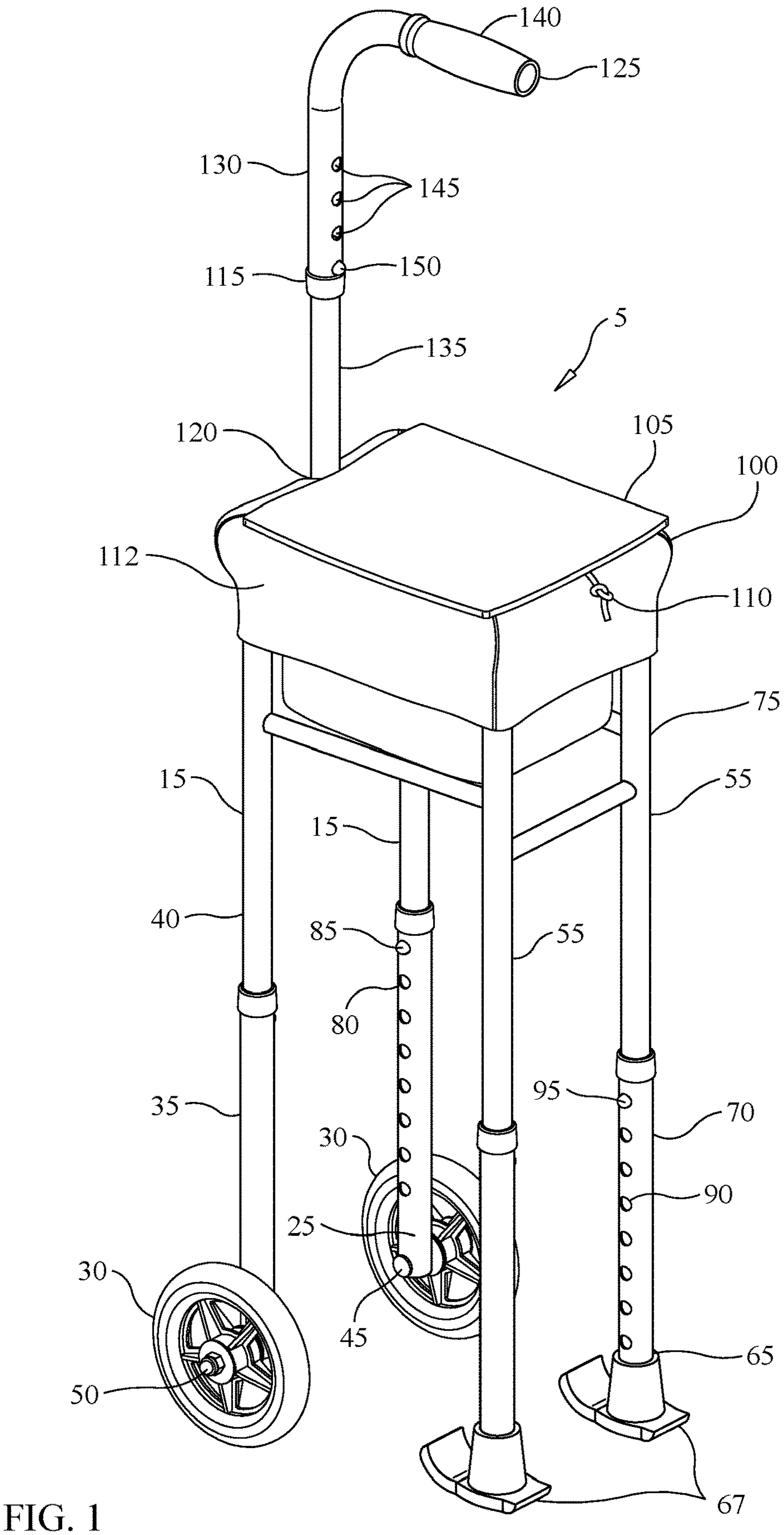
FIG. 1 is a perspective view of an embodiment of the apparatus with storage compartment.
Figure 2:
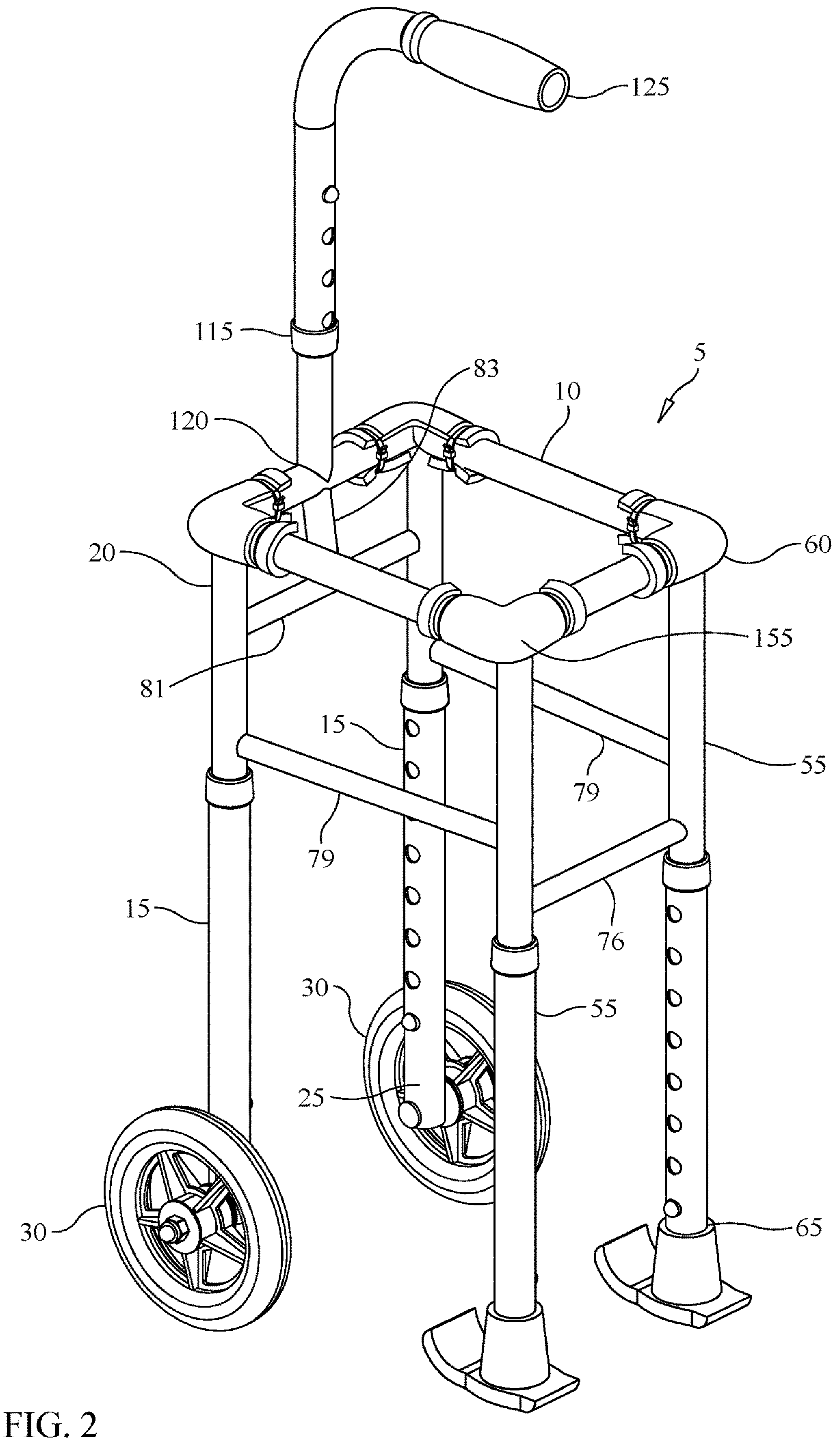
FIG. 2 is a perspective view of an embodiment of the apparatus without the storage compartment.

Turning to FIGS. 1 and 2, the apparatus 5 is comprised of horizontal frame 10, which in one embodiment is shaped to form a planar surface. A plurality of front legs 15 have a first end 20 and a second end 25, with the first end 20 being affixed to frame 10. The attachment of front legs 15 to frame 10 is best shown by FIG. 2. In one embodiment, front legs 15 are adjustable, and various methods may be used for adjustment and are considered within the scope of this invention. In one non-limiting example embodiment, front legs 15 are formed of a first front leg element 35 and a second front leg element 40, wherein second element 40 is at least partially disposed within first element 35, and second element 40 is telescopically extendable therefrom. It should be readily apparent by those skilled in the art, that in an alternative, the telescopic leg orientation can be reversed such that the front leg first element 35 could be at least partially disposed within and extendable therefrom the second element 40. In another embodiment, front legs 15 are formed of a non-extendable single element.

In one embodiment, frame 10 and front leg front leg second element 40 are not affixed but are integrally formed and front second element 40 is formed contiguous with frame 10. In this embodiment, frame 10 is shaped to define front leg second elements 40, wherein front leg first elements 35 slides over front second element 40.

A plurality of wheels 30, are affixed to the second end 25 of legs 15. A variety of wheels may be utilized for this purpose. In one example embodiment, wheels 30 may have a rubber surface and be 5" in diameter, however, a wide variety of wheel composition and sizes may be employed. Wheels 30 may be affixed to second end 25 of front legs 15 through axle 45 passed through second end 25, and in one embodiment, said axle may be a threadable bolt 50, and in other embodiments, a non-threadable axel element may be used, such as any pole or pin upon which wheel 30 may revolve. Wheels 30 may be also inserted into a void in second end 25 of first front leg elements 35.

A plurality of back legs 55, in one embodiment, have a back leg first end 60 and a back leg second end 65, with the first end 60 being affixed to frame 10. The attachment of back legs 55 to frame 10 is best shown by FIG. 2. Back legs 55 are attached to frame 10 by any recognized method of affixation including welding. In one embodiment, legs 15 and 55 are integrally formed with frame 10.

In one embodiment, back legs 55 are adjustable, and various methods may be used for adjustment and are considered within the scope of this invention. In one non-limiting example embodiment, back legs 55 are formed of a back leg first element 70 and a back leg second element 75 which is attached to frame 10, wherein back leg second element 75 is at least partially disposed within first element 70, and back leg second element 75 is telescopically extendable therefrom. It should be readily noted that in an alternative, the telescopic leg orientation can be reversed such that the back leg first element 70 could be at least partially disposed within and extendable therefrom the second element 75. In another embodiment, back legs 55 are formed of a non-extendable single element.

In a preferred embodiment, front legs 15 and back legs 55 are integrally formed with frame 10, such as by welding aluminum tubing, injection molding, or any processes producing a unitary element. In one embodiment, such a unitary element may be aluminum, in another it may be plastic. In one embodiment, frame 10, and back leg second element 75 are not affixed but are integrally formed and back leg second element 75 is formed contiguous with frame 10. In this embodiment, frame 10 is shaped to define back leg second element 75, and back leg first element 70 slides over back second element 75. In another embodiment, frame 10, front legs 15, and back legs 55 are separate elements that may be boltably affixed, or be shaped to define male and female threadable elements that may be screwingly engaged. In one embodiment frame 10 is integrally formed with front legs 15, or back legs 55. In another embodiment, frame 10 may be integrally formed with both front legs 15 and back legs 55.

A plurality of glides 67, are affixed to the second end 65 of back legs 55. A variety of glides may be utilized for this purpose. In one example embodiment, glides 67 may be comprised of plastic, rubber, urethane, or any suitable material. The selection of material will depend on the variables such as the desired frictional resistance, the floor surface, and user expectations, desires, rehabilitation needs, and physical abilities.

In certain embodiments, front legs 15 may be adjustable. In one embodiment, the front leg first element 35 may be shaped to define a plurality of front leg apertures 80. Depressible locking pin button 85 may insert within any of the plurality of front leg apertures 80 to lock first front leg 35 and second leg element 40 into position. In one embodiment, the terminal aspect of second leg element 40 is shaped to define a button aperture. In one embodiment, a spring tension button pin may be inserted within the void of the relative terminal aspect of second front leg element 40, such that button 85 is exposed through button aperture. Button 85 is under spring tension and depressible such that button 85 may be directed inwardly and legs moved to register with any of the plurality of front leg apertures 80, as is commonly understood in the art.

In certain embodiments, back legs 55 may be adjustable. In one embodiment, the front leg first element 70 may be shaped to define a plurality of front leg apertures 90. Depressible locking pin button 95 may insert within any of the plurality of front leg apertures 90 to lock first back leg 70 and second leg element 75 into position. In one embodiment, the terminal aspect of second back leg element 75 is shaped to define a button aperture. A spring tension button pin may be inserted within the void of the relative terminal aspect of second back leg element 75, such that button 95 is exposed through a button aperture. Button 95 is under spring tension and depressible such that button 95 may be directed inwardly and legs moved to register with any of the plurality of front leg apertures 90, as is commonly understood in the art.

In a preferred embodiment, apertures 80 and 90, and buttons 85 and 90 are the same, and the same spring tension button pin setup as described above with the terminal aspect of second front leg element 40 and second back leg element 75.

The illustrated button locking mechanism is for illustrative purposes only, and any locking means to permit adjustment of apparatus height is within the scope of the present invention. By way of example, in an alternative, front legs 15 and back legs 55 may be adjusted by a pin inserted through apertures. For example, a ball lock pin, such as those manufactured by Jerico, Inc., could be inserted through apertures in the first front leg element 35 and the second front leg element 40 and first back leg element 70 and second back leg element 75. A wire lock or locking bolt could also be utilized, as could a threadable collar to adjust height of telescoping legs.

Figure 3:
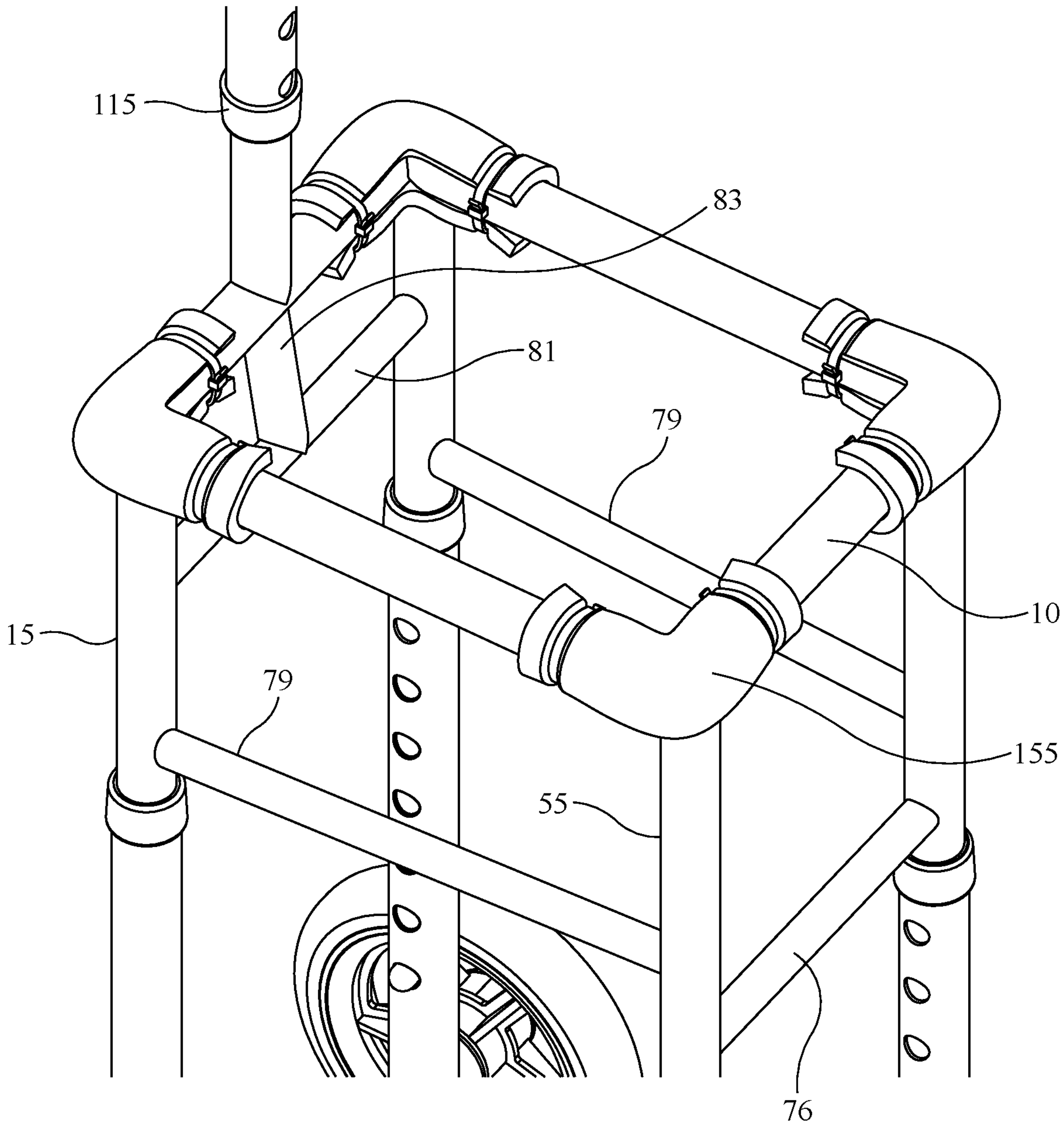
FIG. 3 is a view of an embodiment frame element, showing optional cushioning.

Turning to FIGS. 2 and 3, a plurality of stabilizing supports may be used to provide structural strength. By way of example, back leg stabilizing support 76 is affixed between back legs 55. Front to back stabilizing supports 79 are affixed between front legs 15 and back legs 55. Front leg stabilizing support 81 is affixed between front legs 15. Frame support 83 is affixed between front leg stabilizing support 81 and frame 10, and provides additional structural support. In other embodiments, the size and number of supports is minimized. In some embodiments, stabilizing supports are eliminated.

Returning to FIG. 2, handle 115 is shaped to define a first end 120 and second end 125. First end 120 is affixed to frame 10. In one embodiment, handle 115 is adjustable, and various methods may be used for adjustment and are considered within the scope of this invention. In one non-limiting example embodiment illustrated by FIG. 1, handle 115 is formed of a first handle element 130 and a second handle element 135. First handle element 130 is shaped to bend into a substantially horizontal position. Second handle element 135 is at least partially disposed within first handle element 130, and first handle element 130 is telescopically extendable therefrom. It should be noted that the description of which element is extendable is arbitrary, and used only for illustrative purposes of the relationship between the two components, whereby if handle 130 is held in a fixed position, second handle element 135 would be telescopically extendable therefrom. Handle 115 terminates in grip 140 near the handle second end 125, and in one embodiment, grip 140 is located at the terminal aspect of first handle element 130.

In one embodiment, frame 10, and handle second element 135 are integrally formed and handle second element 135 is formed contiguous with frame 10. In a preferred embodiment, frame 10 and second handle element 135 are comprised of aluminium tubing and welded together, in another embodiment, frame 10 and second handle element 135 are integrally formed by injection molded plastic. In yet another embodiment, handle 115 and frame 10, or second handle element 135 and frame 10, may be separate elements that may be boltably affixed, or be shaped to define male and female threadable elements that may be screwingly engaged. It should be apparent that front legs 15, and back legs 55, handle 115, and frame 10 may be formed as a single element (e.g. flowably molded), or formed as individual elements but permanently affixed (e.g. by welding aluminium tubes), or formed as individual elements and reversibly engagable (for example: screwably engaged or affixed by bolt and nut), or a combination of these. In some embodiments, leg and handle elements are not formed of individual elements but a single structure, and may so formed independently of each other, wherein some elements are multi-part elements and others are formed of single structure elements.

In certain embodiments, handle 115 may be adjustable. In one embodiment, handle first element 130 may be shaped to define a plurality of handle apertures 145. Depressible locking pin button 150 may insert within any of the plurality of handle apertures 145 to lock second handle element 130 and first handle element 135 into position. In one embodiment, the terminal aspect of second handle element 135 is shaped to define a button aperture. A spring tension button pin may be inserted within the void of the relative terminal aspect of second handle element 135, such that button 150 is exposed through button aperture. Button 150 is under spring tension and depressible such that button 150 may be directed inwardly and second handle element 130 moved to register button 150 with any of the plurality of handle apertures 145.

Additionally, it should be readily noted that in an alternative, the telescopic handle orientation can be reversed such that the first handle element 130 could be at least partially disposed within and extendable therefrom the second handle element 135. In another embodiment, handle element 115 is formed of a single integrally formed element.

Turning now to FIG. 3, in one embodiment frame 10 may have optional cushioning 155 disposed therealong, either completely or subtotally. In one example, cushioning 155 may be disposed at the corners of frame 10. In some embodiments, cushioning 155 is omitted.

Returning to FIG. 1, in a preferred embodiment, compartment 100, rests at least in partial contact with frame 10. In one embodiment, compartment 100 is at least partially disposed within frame 10. In one embodiment, compartment 100 rests at least partially within the inner aspect of frame 10, and partially on top and over frame 10. Compartment 100, in one embodiment has an openable lid 105. In one embodiment, lid handle 110 is affixed to lid 105 to facilitate opening. Compartment 100 may be comprised of plastic, urethane, cloth, or any material capable of serving as a compartment when placed on or within frame 10. In a preferred embodiment, compartment 100 is formed by a stretchable material, such as neoprene over frame 10, such that an external portion 112 of compartment 100 is stretched to provide snug engagement with frame 10. In an alternative embodiment, compartment 100 may be comprised of mesh. In yet another embodiment, compartment may be a woven material, such as a basket. It is specifically recognized that in another embodiment, compartment 100 may be an integrally formed single element shaped to define frame 10 and compartment 100 are a single member.

Figure 4:
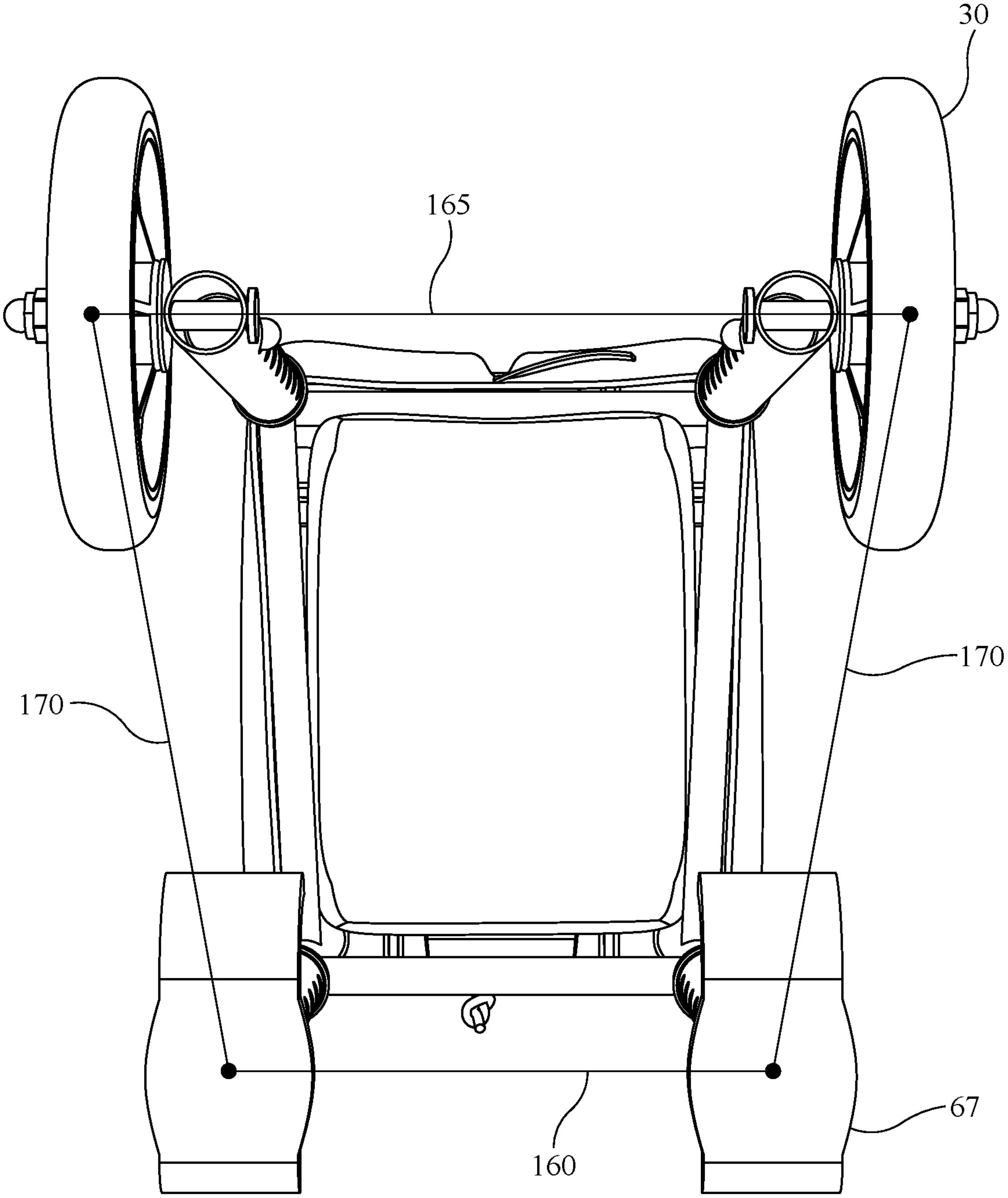
FIG. 4 is a bottom view of the apparatus showing an embodiment trapezoidal distance relationship between embodiment wheels and glides.
Figure 7:
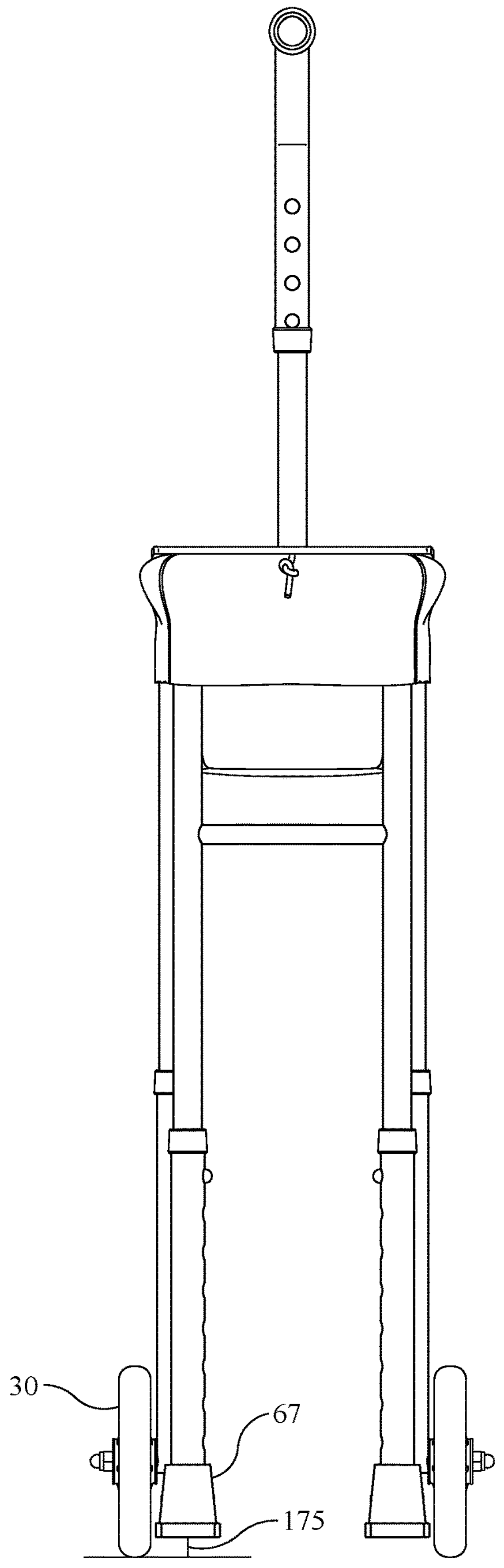
FIG. 7 is a rear view of an embodiment of the apparatus showing the height differential between front and back legs and orientation of the back legs relative to front legs.

Turning now to FIG. 4, one further independent aspect of an embodiment of the present invention is improved cane performance based upon the geometric trapezoidal configuration between the wheels and glides, which has been found to yield increased stability to users. The present inventive assistive walking device has four points of contact on the ground, which increases the base of support, and in turn provides increased support and balance for the user, wherein the inventive design allows greater stability and control, as the placement of the handgrip allows force to be placed directly down through the center of all four legs. Furthermore, as seen by FIG. 4, the footprint of the base forms an isosceles trapezoid shape which provides better lateral stability than a square or a rectangle shape. The trapezoid shape is not inclined to twist out of shape and allows for a compact and minimalist appearance. Furthermore, the narrow orientation of the back legs and gliders, as best seen by FIG. 7, allows for greater foot space during ambulation especially for users with a wide base of support or externally rotated feet. The present device provides good clearance for a step through gait pattern.

Therefore, one independent, optional aspect of the present invention is an overall trapezoidal shape wherein, when viewed from below, the wheels and glides make up four points that form an overall substantially trapezoidal shape. The perimeter of the trapezoid is defined by the wheel-to-wheel distance 165, the glide-to-glide distance 160, and the wheel-to-glide distance 170 bilaterally which form the perimeter of said trapezoid.

Turning now to FIG. 4, the wheel-to-wheel distance 165 between the center of wheels 30, the glide-to-glide distance 160 between the center of glides 67, and the wheel-to-glide distance 170 between the center of wheel 30, and glide 67 is measured. Distances 160, 165, and 170 (applied on each side (i.e. bilaterally)), describe the overall trapezoidal relationship between the wheels and glides—the wheels and glides representing the four points of the trapezoid. In one example embodiment wheel-to-wheel distance 165 is in the range of 6 inches to 12 inches. In one embodiment, the range is 8.5 to 9.0 inches, with one embodiment being 8.5 inches. The glide-to-glide distance 160 may be 3 to 7 inches with a range in one embodiment of 4.25 inches-5 inches. The wheel-to-glide 170 distances in one embodiment is in the range of 7.25-7.5 inches. A trapezoidal ratio may be formed by measuring the wheel-to-wheel distance and the glide-to-glide distance, yielding a wheel/glide differential ratio of 1.8 to 2.0 in one non-limiting example. It should be noted that the overall size of the apparatus may be increased for larger users or decreased for smaller users. It should be noted that the trapezoidal orientation applies to one embodiment of the present invention, and in other embodiments it may be altered or omitted.

Figure 17:
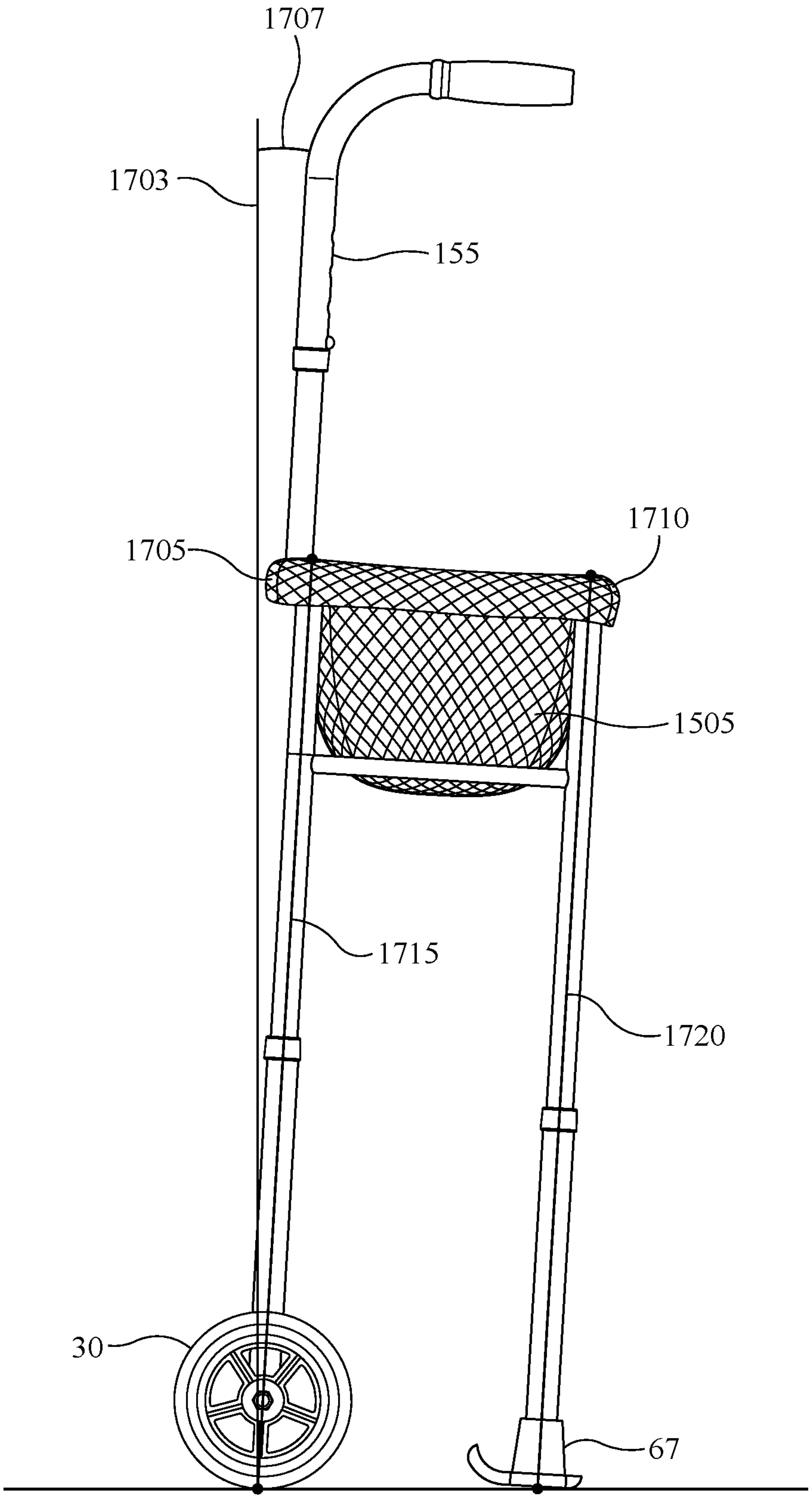
FIG. 17 is an elevation view showing an embodiment apparatus in a resting position for a given embodiment.

One further independent aspect of an embodiment of the present invention is apparatus angle relative to the user. The present inventive assistive walking device was designed with a small slope backwards from front legs to back legs to allow more leverage and allow wheels 55 to roll more easily over small flooring transitions. The apparatus angle helps prevent the device from tilting forward when rolling over transitions such as when rolling from smooth floor to carpeting or a rug. This angle not only improves stability, but it lessens the risk of falls and provides more control for the user. In one embodiment, as shown by FIG. 17, the long axis of the inventive apparatus is not 90 degrees relative to the ground (i.e. perpendicular), but angled backwardly. This provides the user increased stability and improved accessibility. The angle may be achieved in a variety of ways.

Figure 5:
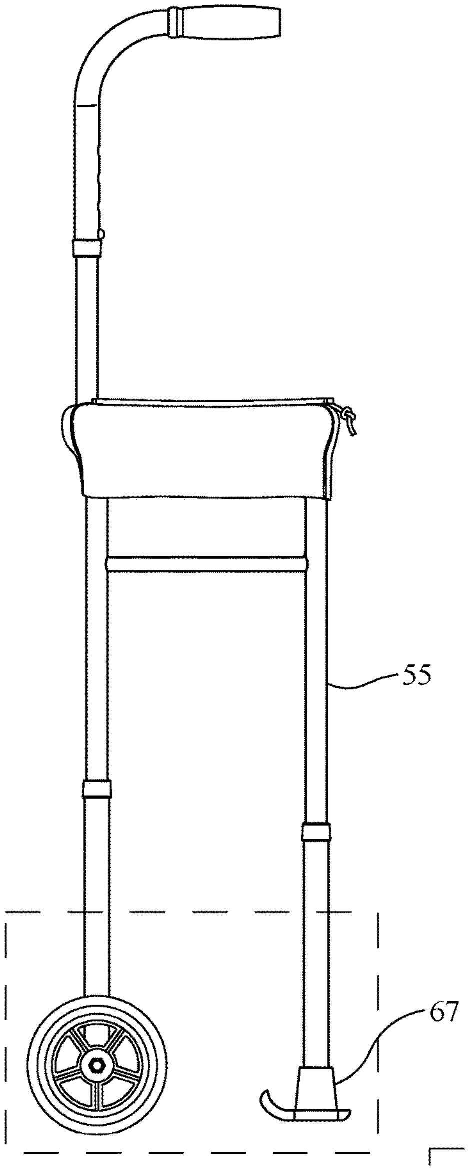
FIG. 5 is an elevation view of an embodiment of the apparatus.
Figure 6:
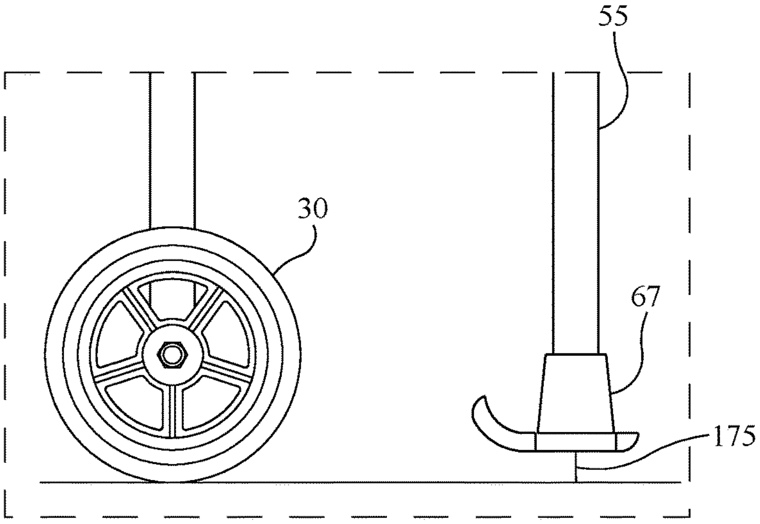
FIG. 6 is an enlargement of the marked portion of FIG. 5 showing the distance differential between legs, including wheels and glides.

First, turning to FIGS. 5-7, the overall length of back legs 55 and glides 67 may be shorter than the overall length of front legs 15 and wheels 30. This yields a front leg to back leg height differential value 175 which will provide a forward angle. Thus, FIG. 17 shows a front leg, frame-to-ground distance 1715 exists between the top of the frame at the attachment point of the front legs on the frame and the ground, and a back leg, frame-to-ground distance 1720 exists between top of the frame at the attachment point of the back legs on the frame and the ground. These distances include legs and wheels and legs and glide. In one preferred embodiment the leg height differential value 175 is in the range from 0 to 1.5 inches, in one embodiment, the range is between 0.5-1.0 inches, with one preferred embodiment being 0.75 inches.

Figure 18:
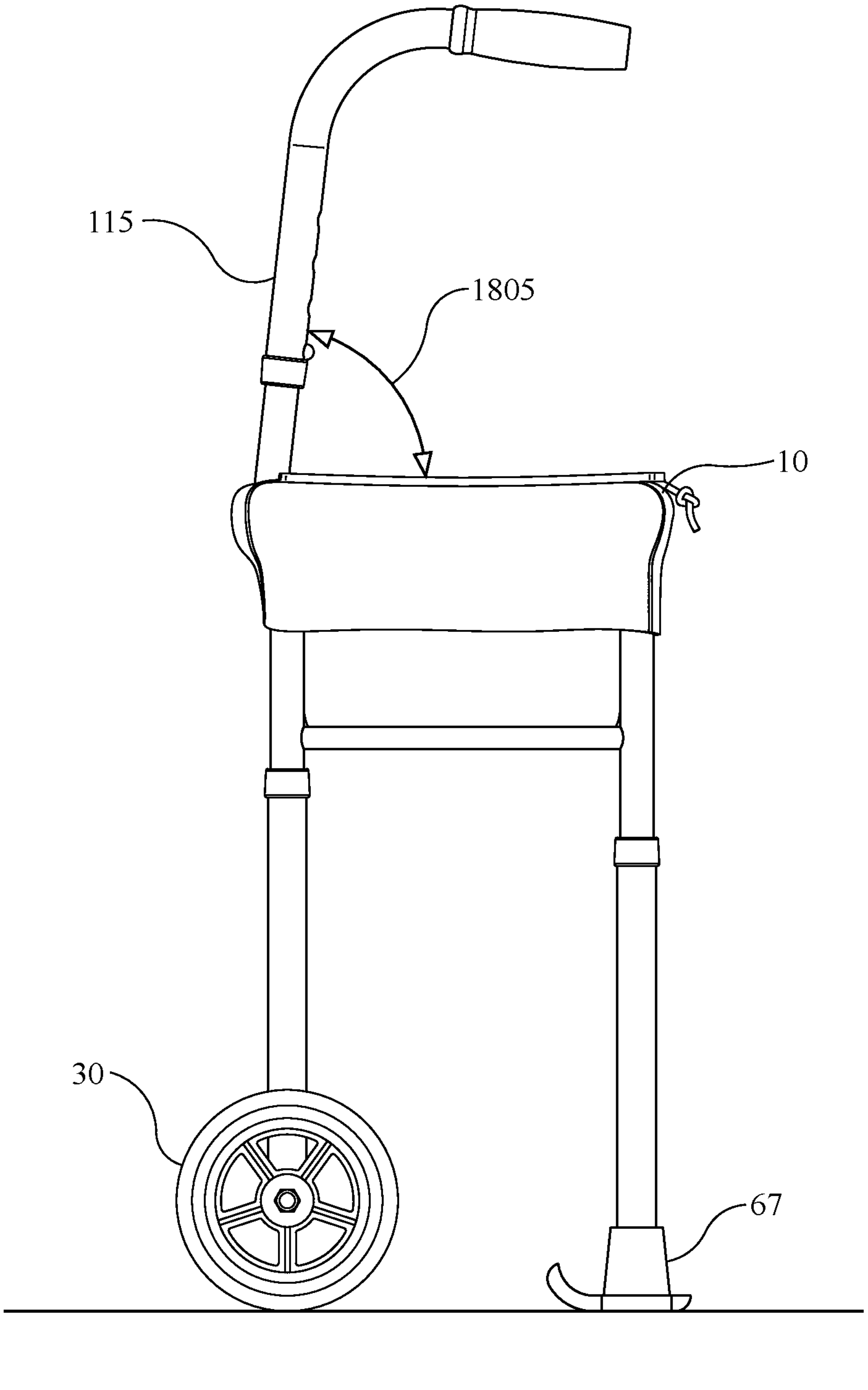
FIG. 18 is an elevation view showing an embodiment apparatus showing the relationship between the handle and frame.

Second, the frame itself may be angled to achieve a desirable forward angle. For example, measuring from horizontal, frame 10 may be angled relative to the horizon to bring grip 140 backwardly. Third, as shown by FIG. 18 handle 115, may be itself shaped to define a desirable forward angle 1805, wherein the angle 1805 between handle 115 and frame 10 is and less than 90 degrees and in one embodiment being between 78 and 89 degrees, and in one preferred being embodiment being 83 degrees. It is specifically realized that these various options of achieving an apparatus angle may be used together or independently of each other.

Figure 8:
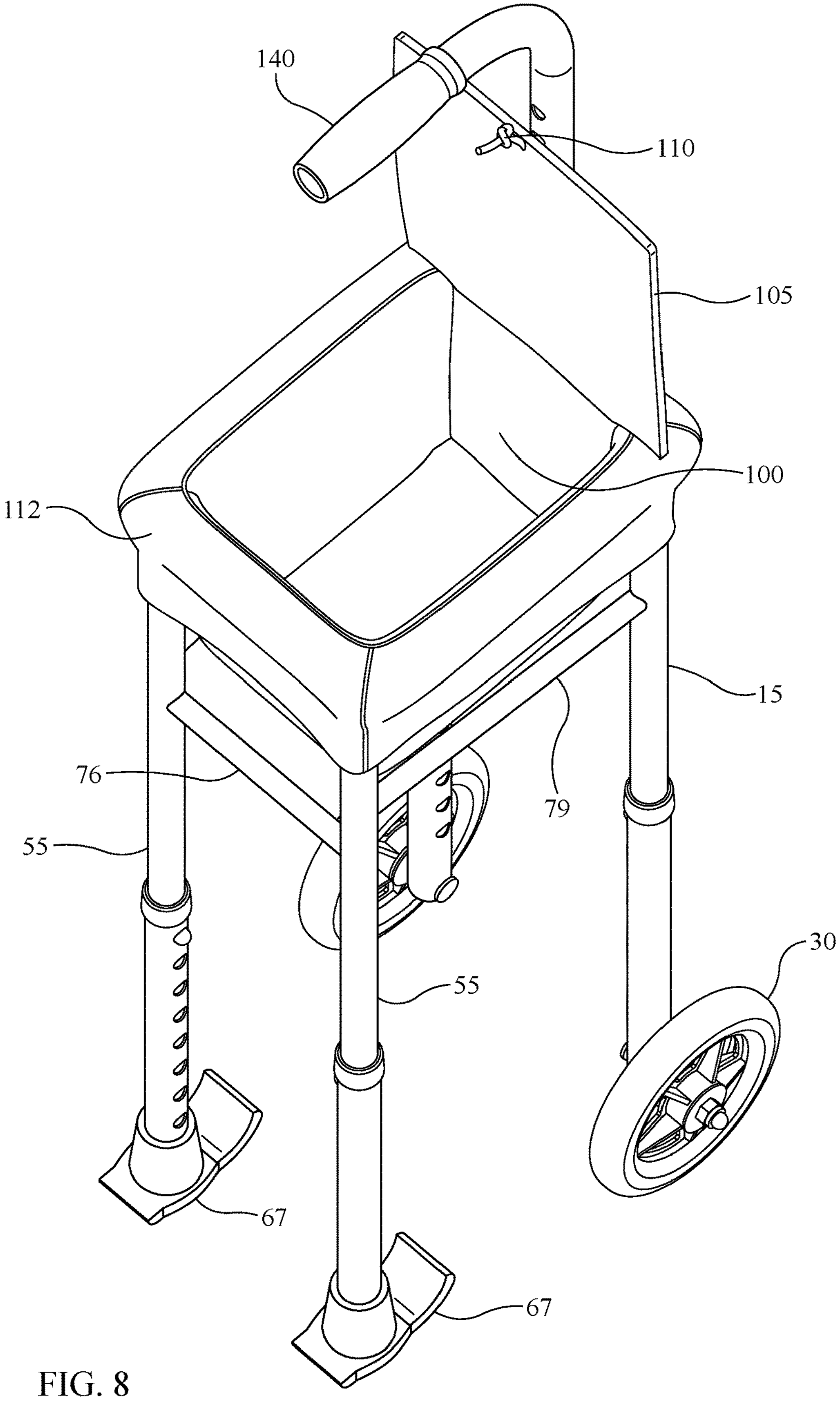
FIG. 8 is a top perspective view showing an embodiment of the present invention demonstrating an optional embodiment compartment.

FIG. 8 best illustrates compartment 100 with lid 105 raised. Compartment 100 may be divided to provide organizational subcompartments. Lid 105 can rest on compartment 100 or fitted snugly to permit sealing engagement between the two.

Figure 9:
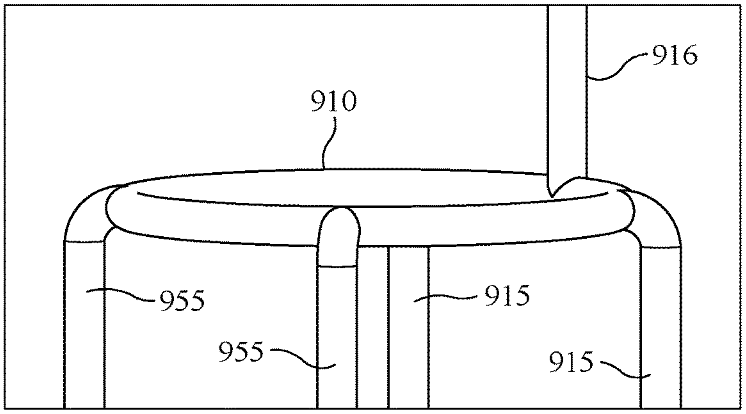
FIG. 9 is a view of an alternative embodiment oval frame.
Figure 10:
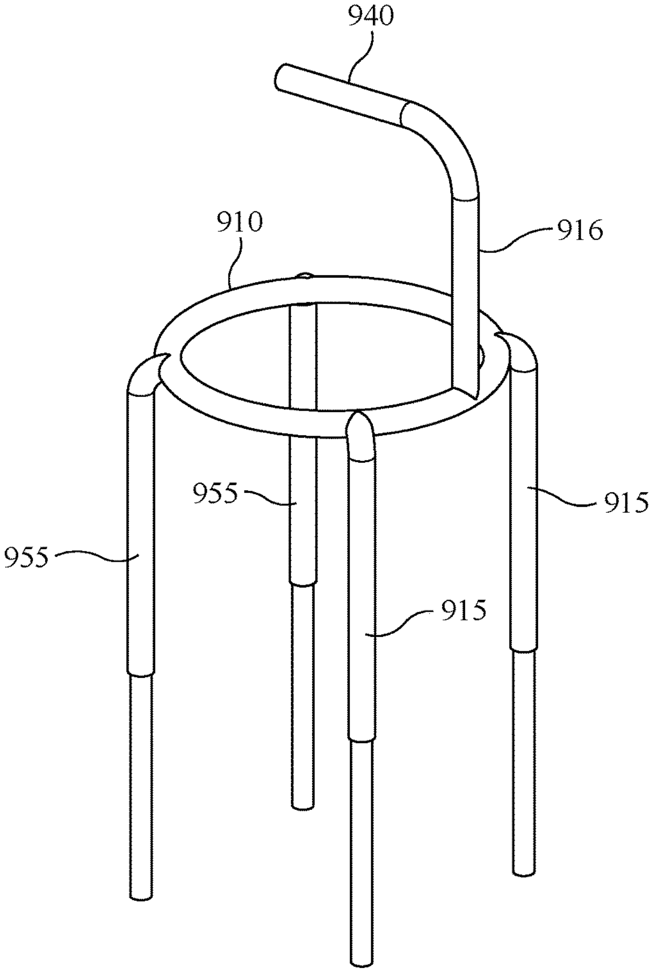
FIG. 10 is a perspective view of alternative embodiment oval frame

FIGS. 9 and 10 illustrate an alternative embodiment shaped to define an oval frame 910 and further shaped to define back legs 955 and front legs 915, and handle 916 arising therefrom. Legs 915, 955, and handle 915, like other embodiments, may be affixed by any suitable means of attachment, including welding, soldering, brazing, or other means of permanent affixation. As mentioned previously, frame 910, legs 915, 955, and handle 915 may be formed of individual components and reversibly affixed such as by threadable bolt or shaped to define thredable elements and screwably affixed.

It should be realized that the frames demonstrated are mere examples, and the frame may be a variety of shapes including round, oval, quadrilateral, rectangle, square, trapezoidal, or triangular. In another embodiment, the frame may be oriented substantially vertically, or oriented in equal measure vertical and horizontal and/or cuboidal, such that frame size, shape, or orientation is not limiting.

Figure 11:
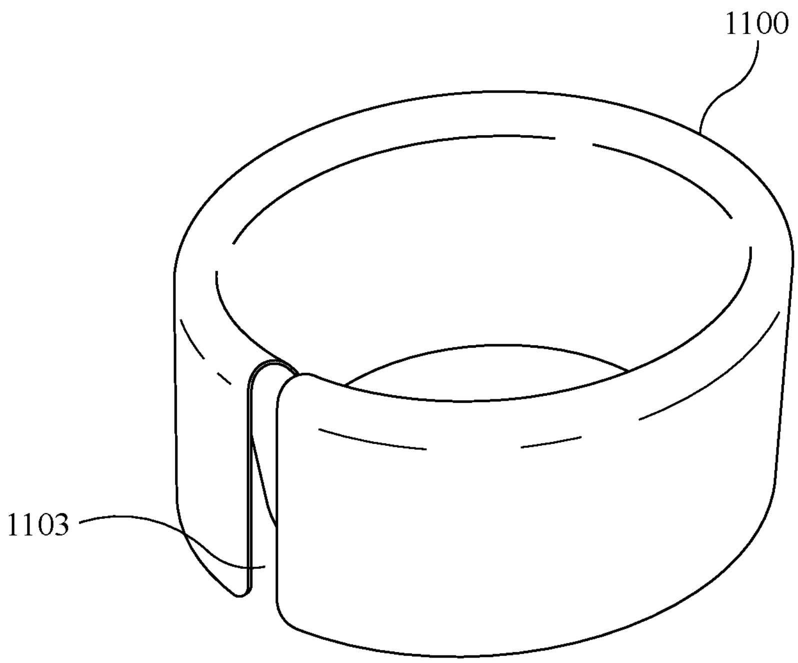
FIG. 11 is a top perspective view of an embodiment oval compartment.
Figure 12:
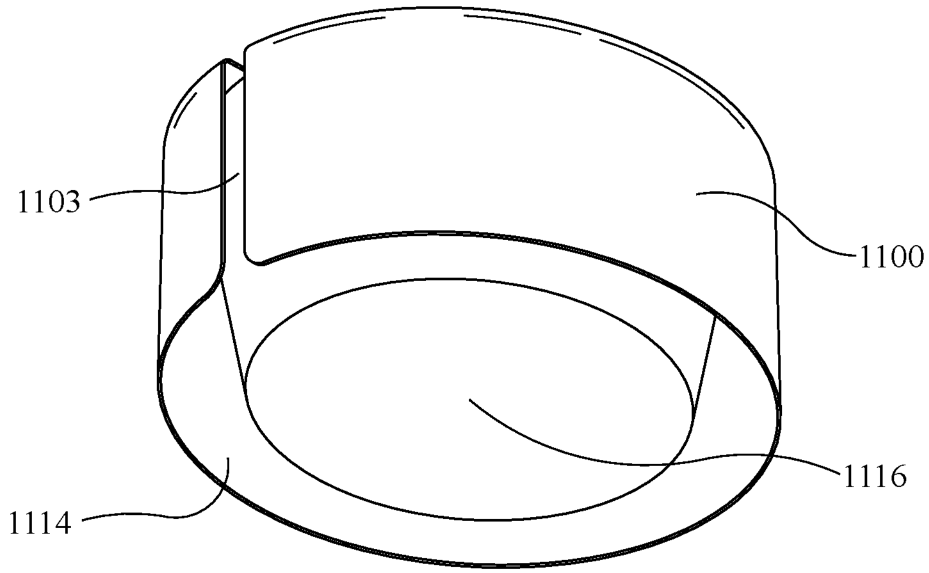
FIG. 12 is a bottom perspective view of an embodiment oval compartment.
Figure 13:
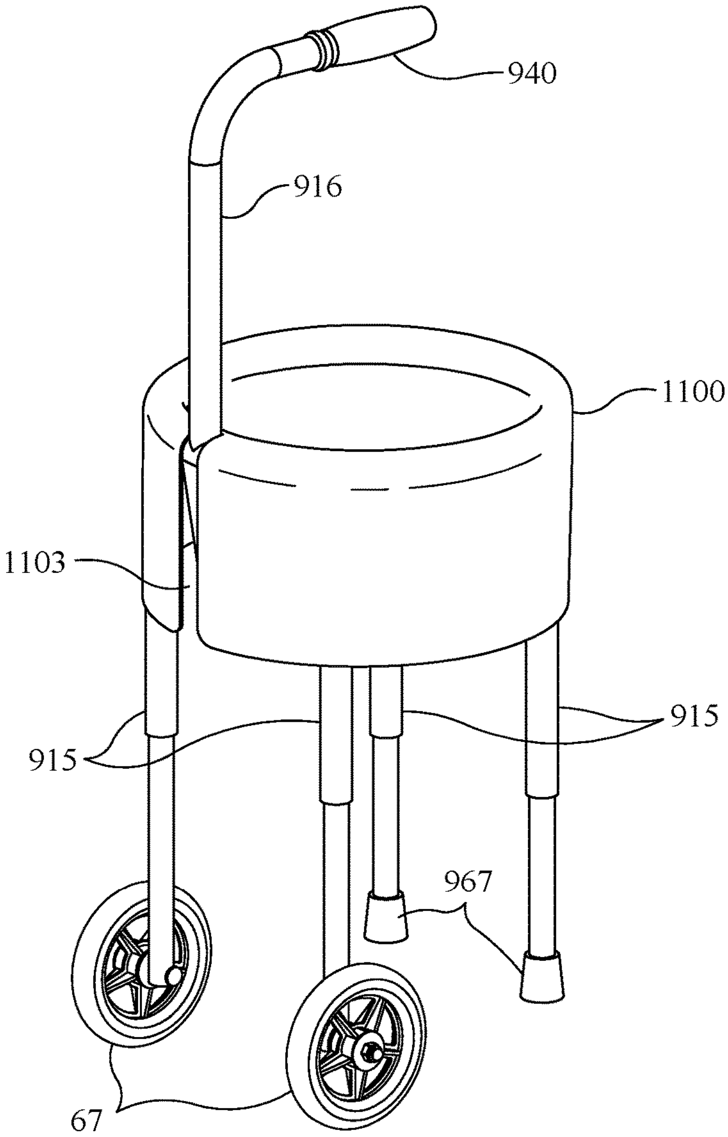
FIG. 13 is a perspective view of an alternative embodiment apparatus.
Figure 14:
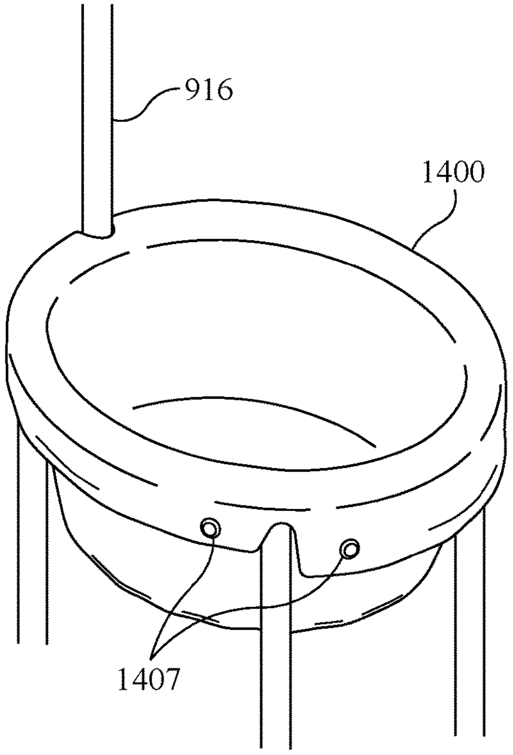
FIG. 14 is an alternative embodiment snap-coupled compartment.

FIGS. 11, 12, and 13 illustrate an embodiment oval compartment 1100. Compartment 1100 is shaped to define channel 1103 to accommodate a portion of handle 916 passing therethrough. Bottom surface 1116 of compartment 1100 fits within the inner aspect of frame 910, and compartment 1100 is shaped to define an outer surface 1114 inside which frame 910 rests. FIG. 14 shows an embodiment round frame element with a soft compartment 1400 which may be reversibly secured around frame 910 reversibly attached by snap buttons 1407 or similar methods.

Figure 15:
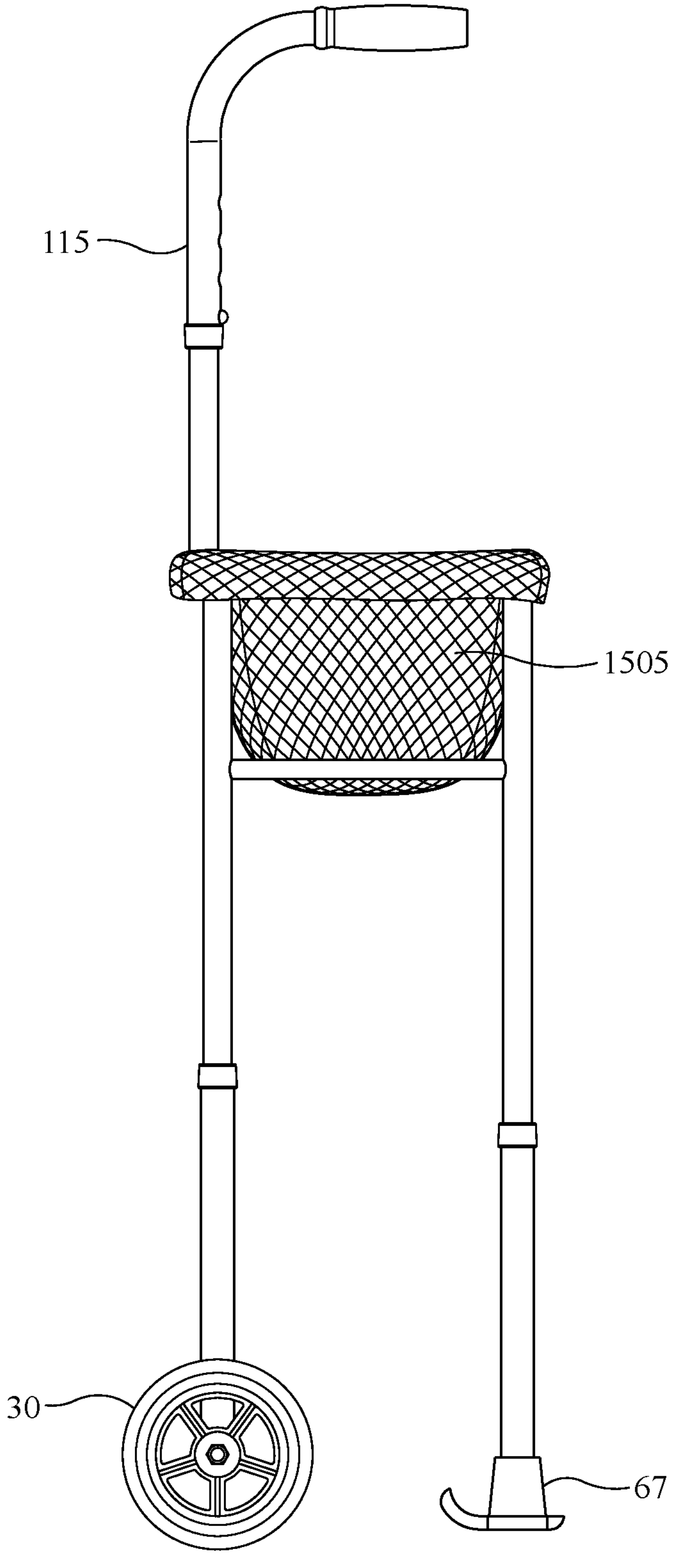
FIG. 15 is an elevation view of an example of alternative embodiment storage.
Figure 16:
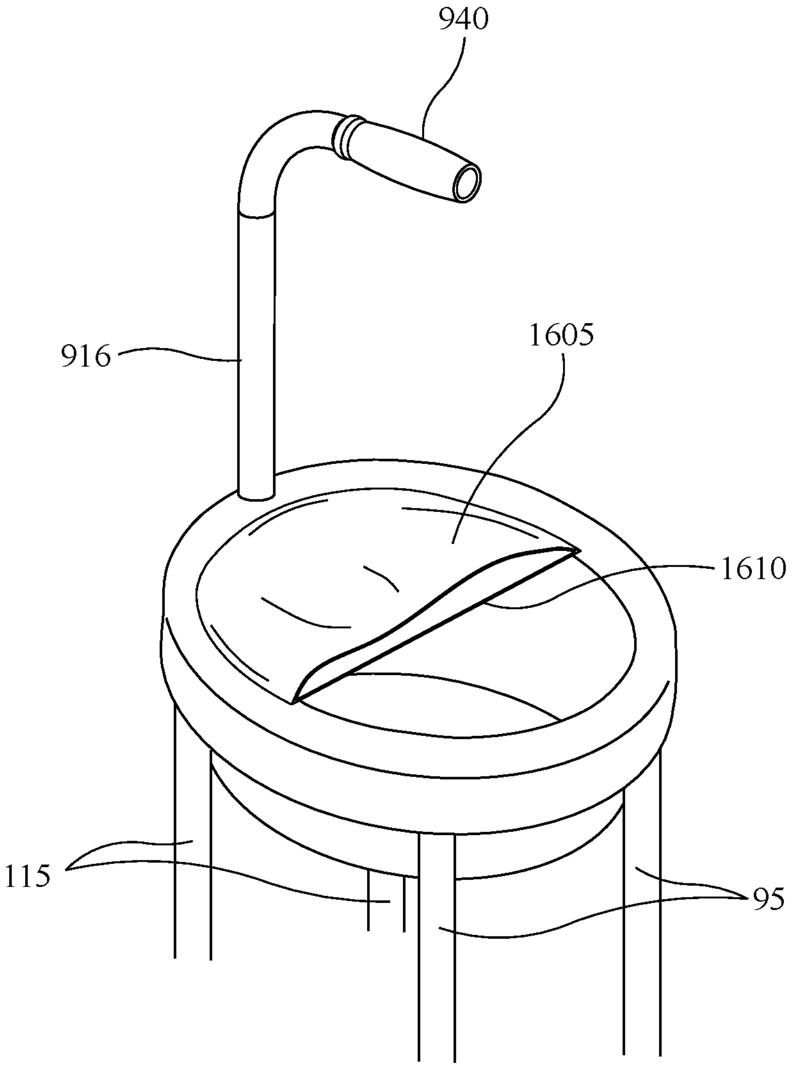
FIG. 16 is a perspective view of an alternative embodiment storage compartment.

One aspect of the present invention is to provide the user the ability to store, carry, and transport personal items. A variety of storage options may be utilized including a ridgid box compartment, a soft fabric basket, wire basket, one or more cup holders, mesh webbing or netting, or a slim pocket. For example, FIG. 15 illustrates an alternative embodiment mesh storage netting 1505, disposed along frame 10. In another embodiment the storage may be of different size and different orientation. For example, as illustrated by FIG. 16, a substantially planar compartment 1605 may be used and disposed over, or within, frame 10. Planar compartment 1605 may extend fully or subtotally across the frame, as shown by FIG. 16. In one embodiment, the compartment may include pocket 1610. A It should be noted that various storage options are disclosed, as are a variety of frame geometries. Any storage option or combination of storage options may be used with a frame geometry that is essentially quadriliteral, rectangular, oval, square, triangular, or circular.

FIG. 17 illustrates the apparatus angle relative to the user. In one preferred embodiment, the apparatus, when rested on a flat horizontal ground surface, is angled backwardly. Plumb line 1703 represents a true perpendicular 90-degree vertical relative to the ground as measured from the center of wheels 30. Frame 10 has a frontmost aspect 1705 and rearmost aspect 1710. In this orientation, if the height of the frontmost aspect 1705 and rearmost aspect 1710 is measured from frame 10's top to the level, yielding a frontmost aspect to ground height 1715 and a rearmost aspect to ground height 1720. In one embodiment rearmost aspect to ground height 1720 will be less than frontmost aspect to ground height 1715 creating a frame-height disparity. In one embodiment, a frame-height disparity of 0.75 inches has been found to be beneficial, whereby the rearmost aspect to ground height 1720 is 0.75 inches less than the measured frontmost aspect to ground height 1715. The apparatus is oriented such that the angle 1707 between plumb line 1703 (representing vertical) and the long axis of handle 115 is the range of 0 to 10 degrees with a preferred range of 6 to 8 degrees in one preferred embodiment.

FIG. 18 illustrates an alternative embodiment where handle 115 and frame 10 are not perpendicular. In this embodiment, the angle 1805 between handle 115 and the long axis of frame 10 is less than 90 degrees. In one preferred embodiment, angle 1805 is in the range of 78 to 89 degrees, with one preferred embodiment being 83 degrees.

Figure 19:
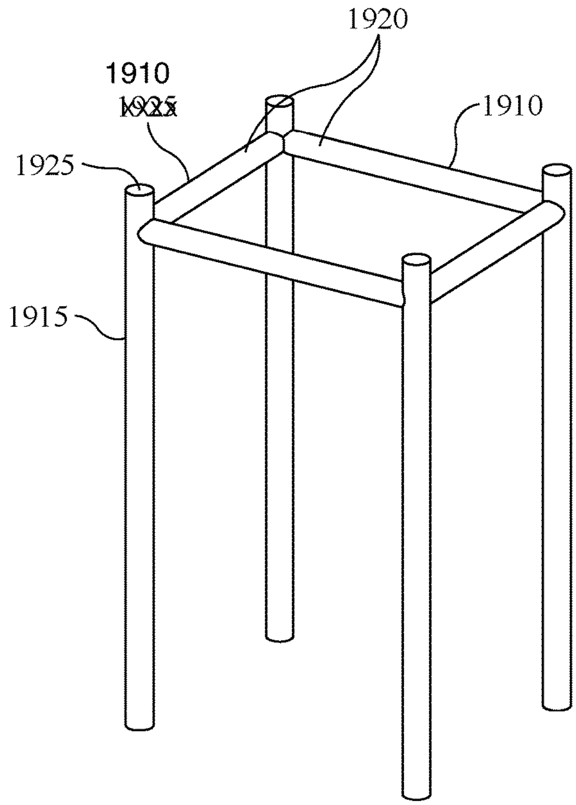
FIG. 19 is an alternative leg embodiment with rounded corners and an alternative frame connection.

FIG. 19 illustrates an alternative embodiment, wherein legs 1915 are tubelike in shape and extend to the topmost aspect of the embodiment horizontal frame plane bound by frame 1910 of which legs 1915 form the corner. In this embodiment, frame elements 1920 affix to legs 1915, such that legs 1915 form rounded corners. Legs 1915 and frame elements 1920 together form frame 1910. End caps 1925 may be used to cap off the terminal aspect of legs 1915; in the alternative, legs 1915 are shaped to define a closed top surface. In this embodiment, because the corners are rounded, it may be possible to omit cushioning 60. As an additional alternative embodiment of FIG. 19, for illustrative purposes, frame 1910 is shaped to define a trapezoid, however could be rectangular or square.

Figure 20:
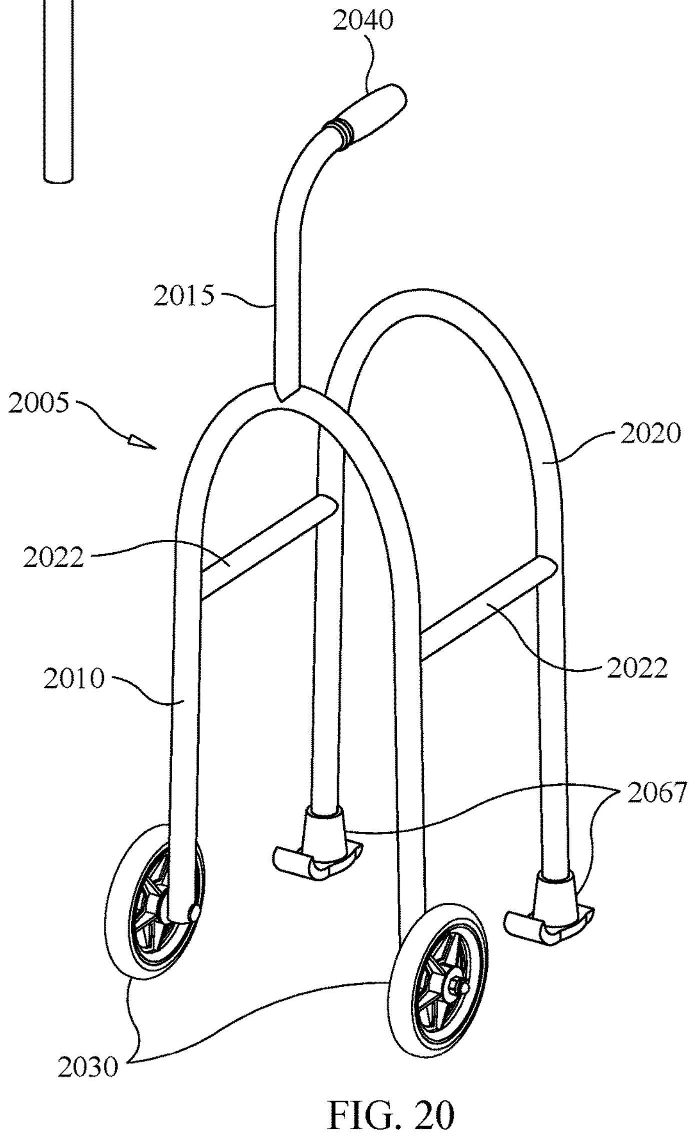
FIG. 20 is a perspective view showing an alternative embodiment single element, wheel-to-wheel leg design.

FIG. 20 illustrates an optional embodiment 2005. Front legs 2010 are formed of an arcuate, front leg element having a first end and second end terminating in wheels 2030 at either end. Handle 2015 shaped to define a first end and a second end, wherein first end is affixed to said front leg element 2010, and second end of handle 2015 terminates in a grip 2040. Arcuate rear leg element 2020, has a first end and a second end, wherein a pair of glides 2067 is affixed to the first end and second end of the arcuate rear leg 2020. A plurality of bracing elements 2022 each having a first bracing element end and second bracing element end, the first bracing element ends affixed to the arcuate front leg elements and the second bracing element ends affixed to the rear leg elements. In an alternative embodiment, handle 2015, may be affixed to arcuate rear leg element 2020. In still another alternative, handle 2015 may be mounted on a bracing element between front leg element 2021 and rear leg element 2020.

Figure 21:
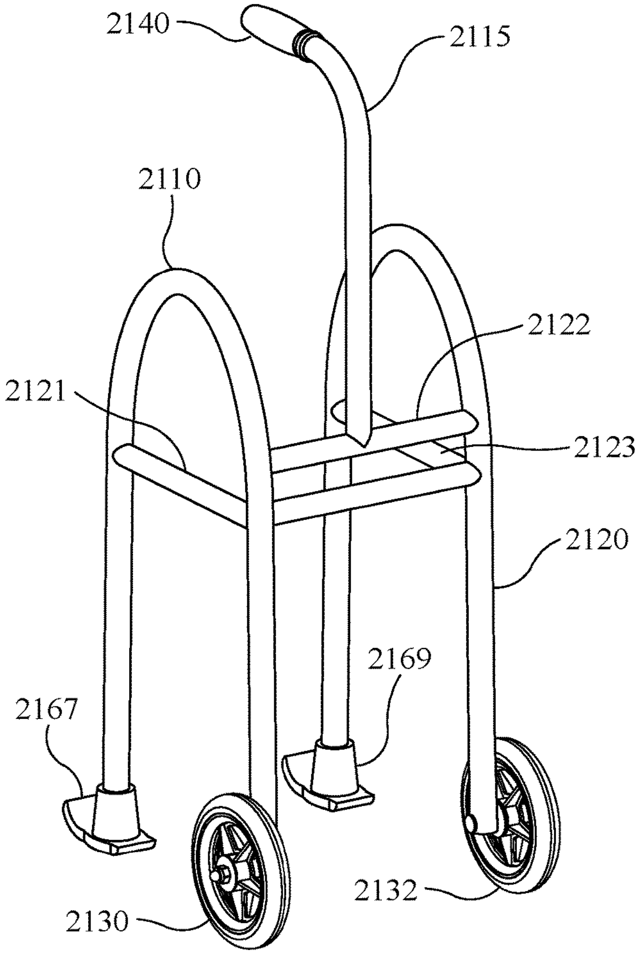
FIG. 21 is a perspective view showing an alternative embodiment single element, wheel-to-glide leg design.
Figure 22:
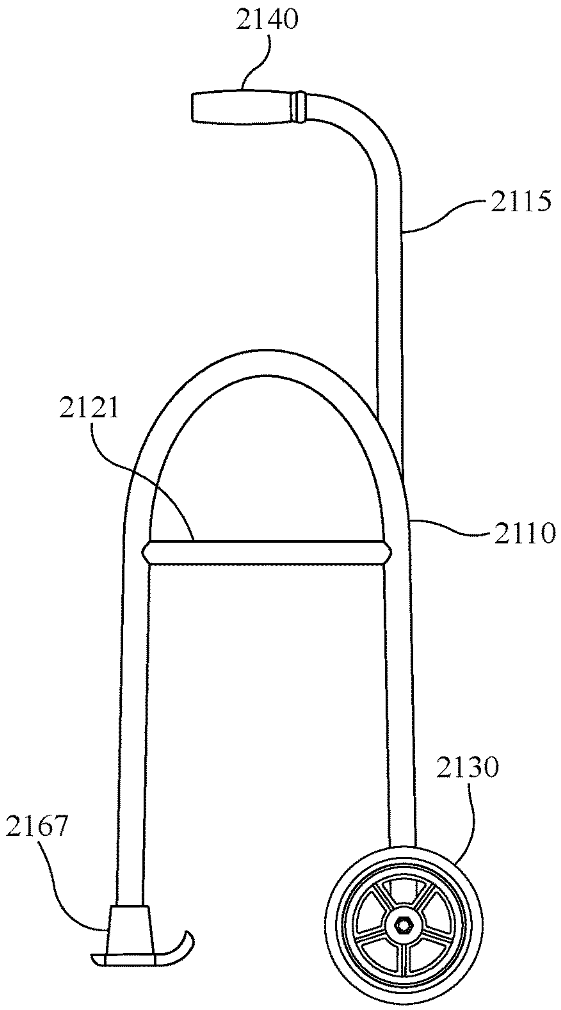
FIG. 22 is an elevation view of showing an alternative embodiment single element wheel-to-glide design.

FIGS. 21 and 22 show an optional embodiment 2105. Arcuate first leg element 2110, has a first end and a second end. Arcuate second leg element 2120 has a first end and a second end. A first wheel 2130 being affixed to the first end of the first leg element, and a second wheel 2132 is affixed to the first end of the second leg element 2120.

A first glide 2167 is affixed to the second end of the first leg element 2110, and a second glide 2169 is affixed to the second end of the second leg element 2120. At least one front bracing element 2122 has a first end and second end, wherein the front bracing element first end is affixed to the first leg 2110 element and the front bracing element second end is affixed to the second leg element 2120. A first side bracing element 2121 having a first end and second end, wherein the first end of first side bracing element 2121 is affixed to the arcuate first leg element 2110, and the second end of the first side bracing element 2121 is affixed to a different position on the the arcuate first leg element 2110. A second side bracing element 2123 having a first end and second end, wherein the first end of the second side bracing element 2123 is affixed to the arcuate second leg element 2120, and the second end of the second side bracing element 2123 is affixed to a different position on the arcuate second leg element 2120. A handle 2115 is shaped to define a first end and a second end, wherein first end is affixed to said front bracing element 2122, and second end terminates in a grip 2135.

The term "glides" as used herein is to be construed expansively. Any termination of leg, permitting leg to be moved against a floor surface is considered a "glide" including leg footings, glides typically used on walkers or walk assist devices, tennis balls, or other structure permitting the leg to traverse the ground.

Likewise, the term "grip" as used herein is to be broadly construed as an surface capable of being held by the human hand and permitting reasonable operation of the device. In one embodiment, the grip may be merely the termination of the handle element aptly positioned to be gripped by the hand.

It should be noted that compartments as disclosed herein may be disposed in contact with the apparatus in any way and specifically may attach to the frame, the legs, the handle, or to any bracing independently or cooperatively. It should be noted that the inventive compartment may be affixed or formed contiguous with any part of device and may be affixed or reversibly attachable.

Various embodiments are herein disclosed in illustrations and descriptions for illustrative purposes recognizing that various combinations of may be used together or independently. Any combination of features and elements disclosed in the various drawings and specifications herein, that may be used together with other features and embodiments in other portions and illustrations of this disclosure, are considered part of the scope of this invention. Furthermore, certain aspects of embodiments disclosed herein may be omitted from certain embodiments without departing from the spirit and scope of the inventive disclosure.

It should be noted that various embodiments of the present invention may be applied in a variety of settings including individual use, rehabilitation, nursing home facility or hospital use.

Although the present invention has been described with reference to the preferred embodiments, it should be understood that various modifications and variations can be easily made by those skilled in the art without departing from the scope and spirit of the invention. Accordingly, the foregoing disclosure should be interpreted as illustrative only and is not to be interpreted in a limiting sense. It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

I claim:

1. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the front leg frame to ground distance and the back leg frame to ground distance is equal, wherein the angle between handle and the long axis of frame is less than 90 degrees.

2. The device of claim 1, wherein the horizontal frame shaped to form a planar surface is shaped to substantially define a quadrilateral.

3. The device of claim 2, wherein the quadrilateral frame is a rectangle.

4. The device of claim 1, wherein the front leg frame-to-ground distance is greater than the back leg frame-to-ground distance, wherein when rested on a flat horizontal ground surface.

5. The device of claim 1, wherein the compartment is formed of mesh.

6. The device of claim 1, wherein the compartment is a substantially planar compartment having a pocket.

7. The device of claim 1, wherein the angle between the long axis of the handle and vertical is in the range of 0-10 degrees.

8. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the horizontal frame shaped to form a planar surface is shaped to substantially define an oval.

9. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the horizontal frame shaped to form a planar surface is shaped to substantially define a circle.

10. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the horizontal frame shaped to form a planar surface is shaped to substantially define a triangle.

11. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly;

wherein the horizontal frame shaped to form a planar surface is shaped to substantially define a quadrilateral; and wherein the quadrilateral frame is a trapezoid.

12. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the compartment is formed of plastic.

13. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the compartment is formed of cloth.

14. A therapeutic walk assist device comprising:

a horizontal frame shaped to form a planar surface;

a plurality of front legs, wherein said front legs have a first end and a second end, wherein said first end is affixed to said horizontal frame;

a plurality of back legs, wherein said back legs have a first end and a second end, wherein said first end is affixed to said horizontal frame;

a pair of wheels each being affixed to the second end of said front legs, wherein a wheel-to-wheel distance exists between the two wheels, wherein a front leg, frame-to-ground distance exists between the top of the frame at attachment point of the front leg on the frame and the ground;

a pair of glides, each being affixed to the second end of said back legs, wherein a glide-to-glide distance exists between the two glides; wherein a back leg, frame-to-ground distance exists between the top of the frame at the attachment point of the front leg on the frame and the ground;

a handle shaped to define a first end and a second end, wherein first end is affixed to said frame, and second end terminates in a grip, wherein said handle has a long axis, wherein an a handle angle exists between the long axis of the handle and the long axis of the horizontal frame;

a compartment at least partially disposed in contact with the frame;

wherein the wheels and glides make up four points that form an overall substantially trapezoidal shape, the wheel-to-wheel distance, the glide-to-glide distance, and the wheel-to-glide distance bilaterally forming the perimeter of said trapezoid;

wherein when said wheels and said glides are placed on a horizontal surface, the device is angled backwardly; and wherein the compartment is formed of neoprene.

15. A rolling cane comprising:

a horizontal frame shaped to form a planar surface; a plurality of front legs, wherein said front legs have a first end and a second end, wherein said first end is affixed to said horizontal frame, wherein said legs are formed of a first element and a second element, wherein second element is at least partially disposed within first element, such that second element is telescopically extendable therefrom;

a pair of wheels each being affixed to the second end of said front legs, a wheel-to-wheel distance being between the two wheels;

a pair of glides, each being affixed to the second end of said back legs, a glide-to-glide distance being between the two glides; wherein a wheel-to-glide distance is formed bilaterally;

a handle shaped to define a first end and a second end, wherein first end is affixed to said frame, wherein handle is formed of a first handle element and a second handle element, wherein first handle element is shaped to bend into a substantially horizontal position, wherein second handle element is at least partially disposed within first handle element, and first handle element is telescopically extendable therefrom;

a compartment partially disposed such that a portion of compartment rests in contact with the frame;

wherein the wheel-to-wheel distance, the glide-to-glide distance, and the wheel-to-glide distance bilaterally form a substantially trapezoid shape, with the wheels and glides being for points of the trapezoid;

wherein when rested on a flat horizontal ground surface, device is angled backwardly.

* * * * *